Dec. 29, 1931.    S. A. STAEGE    1,838,966
WINDER MOTOR DRIVE CONTROL SYSTEM
Filed July 16, 1929    2 Sheets-Sheet 1

INVENTOR
Stephen A. Staege.
BY
ATTORNEY

Dec. 29, 1931.   S. A. STAEGE   1,838,966
WINDER MOTOR DRIVE CONTROL SYSTEM
Filed July 16, 1929   2 Sheets-Sheet 2
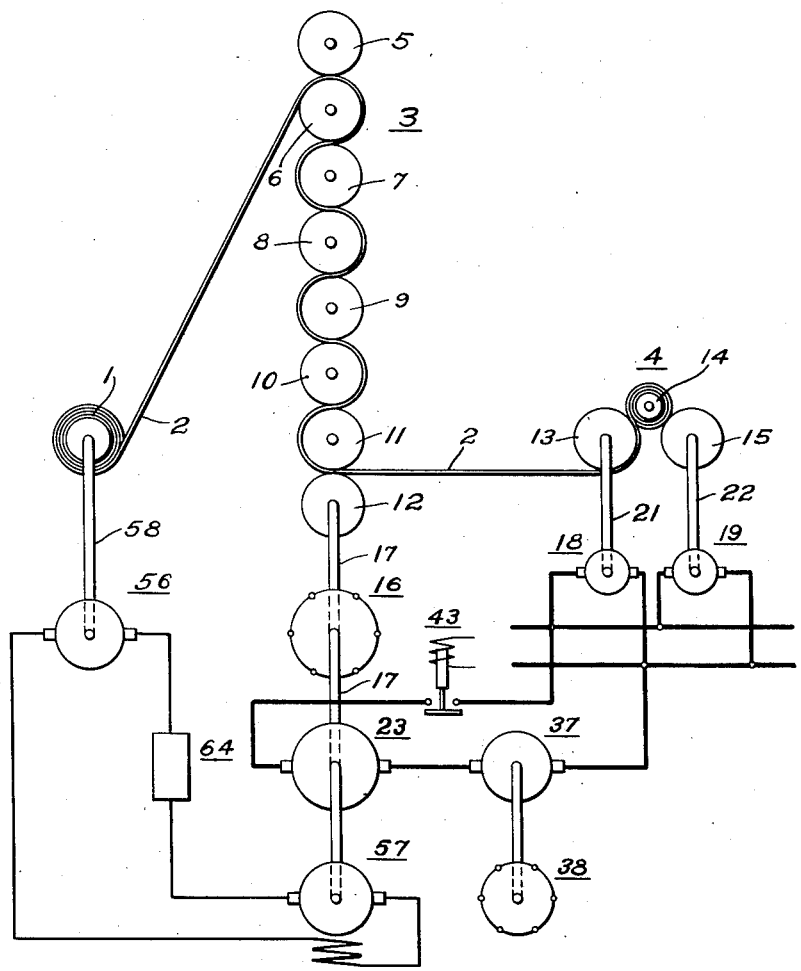
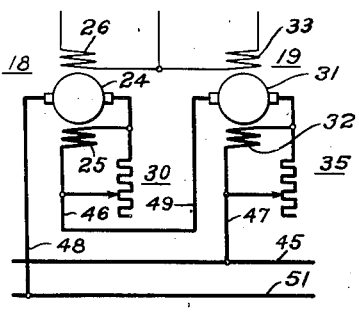
INVENTOR
Stephen A. Staege.
BY
ATTORNEY Patented Dec. 29, 1931

1,838,966

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

WINDER MOTOR DRIVE CONTROL SYSTEM

Application filed July 16, 1929. Serial No. 378,593.

My invention relates to control systems and particularly to systems for controlling the operation of winder motors.

An object of my invention is to provide a control system for winder-motor drives that shall be simple in construction and efficient in operation.

Another object of my invention is to provide for maintaining substantially constant tension in material, as it passes from a calender stack to a winder, during both the acceleration period and normal operation of the calender stack.

A further object of my invention is to provide for operating a plurality of winder-drum driving motors at the same or slightly different speeds and causing each motor to develop a constant but adjustable base torque.

Other objects of my invention will be apparent to those skilled in the art from the following description taken in conjunction with the accompanying drawings, in which:

Fig. 2 is a diagrammatic view illustrating winding reels, calender-stack rolls and motors therefor arranged in accordance with the invention, and Fig. 3 is a diagrammatic view showing the circuit connections of a modified form of my invention.

Figure 1:
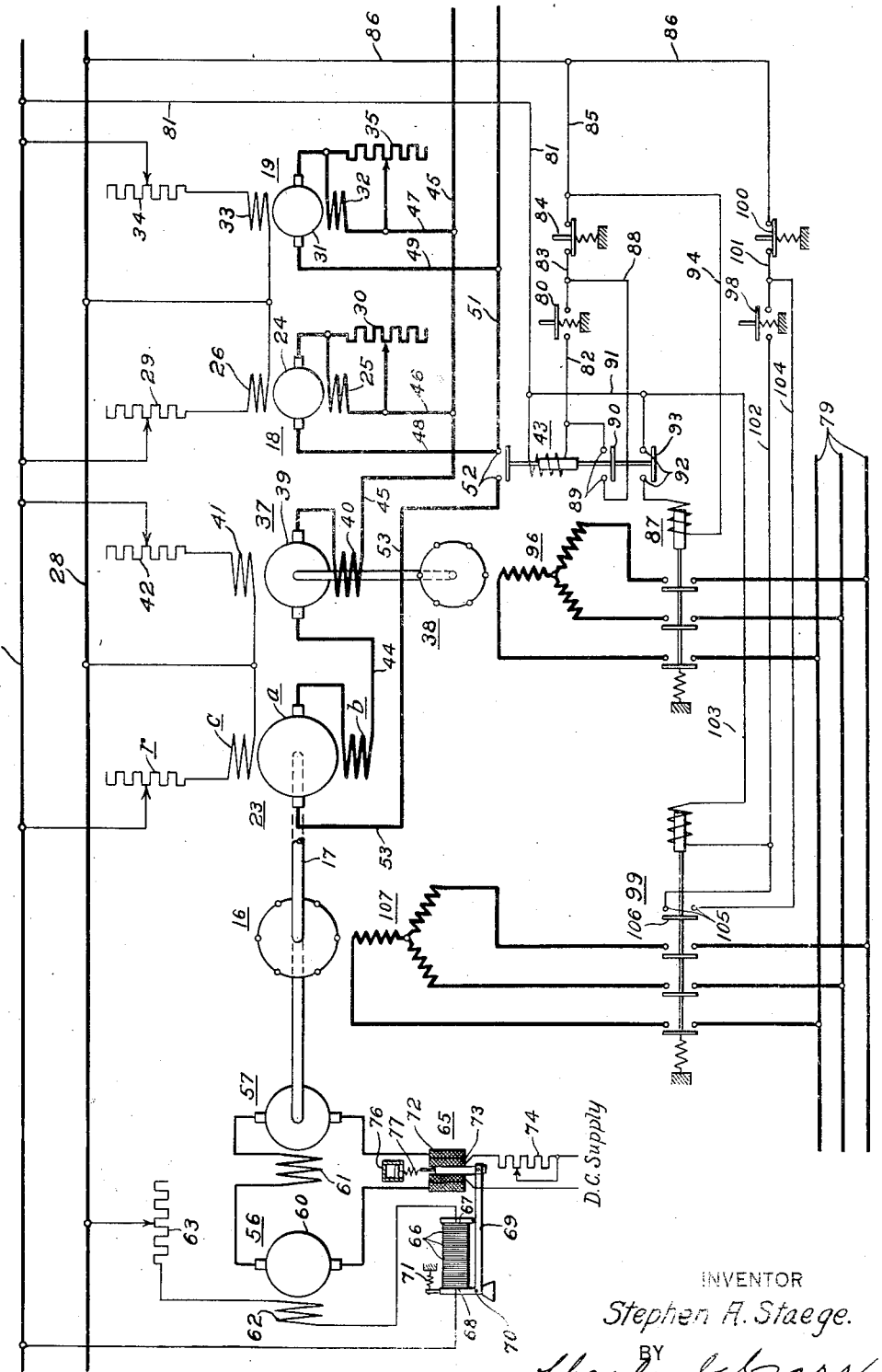
Fig. 1 is a diagrammatic view of circuits and apparatus arranged in accordance with the invention.

Referring to the drawings, a supply reel 1, having material 2, such as paper, wound thereon, a calender stack 3 and a two-drum winder 4 are shown. The material 2 is unwound from the drum 1 and threaded back and forth between the respective rollers or cylinders 5 to 12, inclusive, of the calender stack 3, under a roller 13 of the winder 4 and wound around a cylindrical core 14. The cylindrical core 14 is disposed in tangential relation to the rollers 13 and 15 of the winder 4.

The roller 13 is disposed to draw or pull the material 2 from the calender stack 3 and feed it to the core 14 upon which it is wound, and the roller 15 is disposed to control the degree of hardness or tightness with which the material is wound upon the core. When so driven, the roller 15 may slip slightly with respect to the material on the core, but, as the weight of the roll increases, the slip will decrease.

As shown, the calender-stack rollers are driven by an alternating-current motor 16 through a shaft 17 which is directly coupled to the roller 12 of the calender stack.

The rollers 13 and 15 of the winder may be driven by direct-current motors 18 and 19 through shafts 21 and 22, respectively.

The motors 18 and 19 may be of the compound-wound type or of any other type having a drooping characteristic speed-torque curve. As shown, the motor 18 comprises an armature 24, a series field winding 25 and a separately excited field winding 26. The separately excited field winding 26 may be energized by direct current from a suitable source of power indicated by supply conductors 27 and 28. The current in the winding may be adjusted to any predetermined value by means of a variable resistor 29 disposed in series-circuit relation to the winding, whereby the speed of the motor may be adjusted according to the requirements of operation of the winder 4.

In order that the drooping characteristic of the motor 18 may be adjusted, a variable resistor 30 is provided and disposed in shunt relation to the series field winding 25.

The motor 19 is similar in construction to the motor 18 and comprises an armature 31, a series field-winding 32, and a separately excited field-winding 33. The field winding 33 may be energized by direct current from the power-supply conductors 27 and 28. In order to adjust the motor for operation at a predetermined speed, a variable resistor 34, disposed in series-circuit relation to the field winding 33, is provided, whereby the current in the winding may be regulated.

Since the drooping characteristic of the motor 19 corresponds to that of the motor 18, in order that the torques developed by the respective motors may be either equal in value or bear a constant ratio to one another, a variable resistor 35 is disposed in shunt relation to the series field winding 32.

Power may be supplied to the motors 18 and 19 from a power generator 23. As shown, the generator 23 is coupled to the shaft 17 and disposed to be driven by the alternating-current motor 16. The generator 23 may be of the compound-wound type and comprises an armature winding $a$, a series field winding $b$ and a separately excited field winding $c$. The field-winding $c$ is arranged to be connected to power-supply conductors 27 and 28. The voltage of the generator 23 may be regulated by varying the current in the field winding $c$. Accordingly, a variable resistor $r$ is provided for adjusting the current in the winding.

Since the generator 23 is coupled to the motor 16 that drives the rollers of the calender stack 3, the voltage impressed upon the motors 18 and 19 will be proportional to the speed of operation of the motor 16. It is, therefore, apparent that, when the motor 16 is started and accelerated to full running speed, the voltage of the generator 23 will build up from a zero value to a maximum value for a given speed of operation and field strength. Since the generator 23 is connected across the motors 18 and 19, the voltage impressed on the motors will increase as the speed of the rollers of the calender stack increases.

Assuming that the motors 18 and 19 depend on the generator 23 for their total current supply then they will not rotate until the voltage developed by the generator 23 is equal to the RI drop in the armature of the motors, the generator and the conductors included in the power circuit leading from the generator to the motors, the RI drop referred to being that resulting from the full load or starting current required by the motors. Since the motors 18 and 19 will not rotate until the generator is developing a voltage greater than the RI drop in the power circuit, it follows that material will be drawn through the calender-stack rollers before the winder 4 commences to operate. An objectional slack in the material extending between the calender stack and the winder 4 will, therefore, be developed. When the voltage developed by the generator is sufficient to start the motors, they will operate at such a speed, because of the slack in the material, that the material will be wound upon the winder 4 at a higher rate than it is being unwound from the supply reel 1. Therefore, when the slack has been taken up, the material may be subject to such severe strains that it may be ruptured, a condition to be avoided.

In order that the material may be wound by the winder 4 at the same rate as it is unwound from the supply reel 1, it is important that the motors 18 and 19 shall start to rotate at the same instant as the motor 16 is started. It also is important that the motors 18 and 19 be accelerated at the same rate as the rollers of calender stack 3 in order that the tension in the material between the calender stack and the winder may be maintained at a uniform or constant predetermined value.

In order to cause the motors 18 and 19 to start and to accelerate in synchronism with the starting of the generator 23 and the calender stack 3, a booster generator 37 is provided. The booster generator 37 may be driven by a motor 38 and is disposed to supply full-load current to the motors 18 and 19 when at rest and before the motor 16 is started.

As shown, the booster generator 37 comprises an armature 39, a series field winding 40 and a separately excited field winding 41. The field winding 41 may be energized by direct current from the supply conductors 27 and 28. In order to adjust or regulate the voltage developed by the booster generator 37, a variable resistor 42 is disposed in series-circuit relation to the field winding, whereby the current may be adjusted to any desired value.

The armature 39 of the generator 37 is disposed for connection in series-circuit relation to the armature of the generator 23, across the motors 18 and 19, a switch 43 being provided for this purpose. When the switch 43 is closed, and the motor 38 is operating to drive the booster generator 37, the current in the field winding 41 may be adjusted to such value that the voltage developed is of a value sufficient to cause full-load current to traverse the motors 18 and 19 when they stand at rest. This voltage is, therefore, equal to the full-load RI drop in the circuit comprising the armature and series field winding of the generator 23, conductor 44, the armature 39 of the generator 37, the field-winding 40, conductor 45, the parallel circuit, comprising conductors 46 and 47, the armature and field windings 24 and 25, and 31 and 32 of the respective motors 18 and 19, and conductors 48 and 49, conductor 51, the contact members 52 of the switch 43, and conductor 53 back to the generator 23.

When full-load current is being delivered to the motors, as set forth above, the motors 18 and 19 will turn until the tension in the material is equal to the torque developed. If greater tension is desired, the current in the field-winding 41 of the booster generator 37 may be increased until the voltage developed is of the proper value.

When the motor 16 is started, the rollers of the calender stack 3 and the generator 23 will be accelerated up to their normal operating speed. As the voltage of the generator is directly proportional to its speed, it follows that the motors 18 and 19 will be accelerated in proportion to the rate of acceleration of the calender stack 3 and the generator 23. The rate of acceleration of the motors 18 and 19 may be varied by adjusting the current in the field-winding c of the generator 23 to such value that the voltage of the generator is increased to the value required to effect the desired rate of acceleration. Also, the voltage of the generator 23 may be so adjusted that the sum of this voltage and that of the booster generator 37 is equal to the operating or normal voltage rating of the motors 18 and 19.

It is to be noted that, as the voltage of the generator 23 increases, the speed of the motors 18 and 19 will increase accordingly; but, the counter-voltage of the motors being also a function of their speed of rotation, the current through the motors will remain substantially constant during the period of acceleration. When the motors are running at normal speed, the current will, of course, be of the same value as that supplied by the generator 37 before the calender stack is set in operation. Therefore, the tension on the material as it is wound on the core 14 will remain substantially constant at all times during the operation of the system.

Since the booster generator 37 may be adjusted to develop such voltage that full-load current will flow through the armatures of the generator 23 and the motors 18 and 19 before the motor 16 is started, the motors 18 and 19 will be disposed to accelerate at the same rate as the calender-stack rolls. The rate of acceleration will be in proportion to the rate at which the voltage of the generator 23 is increased. Under such conditions of operation, no slack will be developed in the material extending between the calender stack 3 and the winder 4.

With a view to meeting the requirements of the trade, the rolls of material coming from the winder 4 must be uniformly wound in order that the roll will be of the same degree of tightness or hardness from the center to the outside. In order that the rolls coming from the winder may be of uniform hardness throughout, the motors 18 and 19 may be adjusted to develop the desired relative torques by regulating the current in the separately excited field windings thereof.

If rolls of uniform hardness throughout are required, the current in the field winding 33 of the motor 19 may be so adjusted that it will operate to develop a slightly higher torque than the motor 18. When the roll of material on the core 14 is small and light in weight, the motor 19 being disposed to operate at a higher torque than the motor 18, the roller 15 will slip slightly with respect to the material 2 on the core 14 and cause it to be wound tightly and smoothly. As the roll becomes larger in diameter and heavier in weight, a greater torque will be demanded of the motor 19 because of the increased frictional force exerted by the roll of material upon the roller 15 of the winder. Since the torque demanded of the motor 19 is greater, the motor will run at a lower speed which will be determined by its drooping characteristic. This speed may be only slightly greater than the speed of operation of the motor 18.

In order to provide for maintaining tension at a predetermined value in the material between the supply reel 1 and the calender stack 3, a generator 56 and a series motor 57 are provided. As shown, the generator 56 is disposed to be driven by the reel 1 through a shaft 58; and the motor 57 is connected to the calender-stack drive shaft 17. The generator 56 is electrically connected to the motor 57; accordingly, the generator through material 2 and shaft 58 receives mechanical energy from the calender stack 3 and returns it, as electrical energy, to the motor 57, the motor 57, in turn, being disposed to return the energy through shaft 17 to the calender-stack rolls. According to this arrangement, the generator acts as a drag upon the reel 1, thereby supplying the required tension to the material. All of the power delivered to the generator is returned to the calender-stack rolls, as mechanical energy, except for the losses in the generator 56 and in the motor 57.

In the event that the material 2 extending between the supply reel 1 and the calender stack 3 is broken, the generator 56 will operate to stop the reel 1 very quickly because the driving torque or force is removed, thereby preventing the material from being unwound. In this system, the motor 57, being a series motor, when driven by the motor 16, cannot function as a generator to effect operation of the generator 56 as a motor.

The generator 56, (see Fig. 1), comprises an armature 60 and a separately excited field winding 62. In order to vary the current in the separately excited field-winding 62 to a predetermined value for a given diameter of roll of material on the supply reel 1, a variable resistor 63 is provided and disposed in series-circuit relation to the winding.

In order to maintain the tension in the material extending between the supply reel 1 and the calender stack 3 constant, at a predetermined value, it is required that the voltage developed by the generator 56 shall be maintained constant at a predetermined value. Since the generator 56 will be driven at increasingly higher speeds as the diameter of the roll on the supply reel becomes smaller, the voltage developed will increase in proportion to the increase in speed. If the current in the field-winding 62 is maintained at a predetermined value, it follows that the voltage developed by the generator 56 will also increase in value; therefore, the tension in the material will increase.

In order to maintain the voltage of the generator 56 at a constant value, a variable rheostat 64 is provided for decreasing the current in the field winding as the speed of rotation of the supply reel 1 increases. Accordingly, a solenoid 65 is provided for varying the resistance value of rheostat 64 in accordance with the current delivered by the generator 56 to the series motor 57.

The rheostat 64, as shown, may be of the carbon-pile type and comprises a plurality of carbonaceous discs or plates 66 disposed between terminals 67 and 68. The discs are connected in series-circuit relation to the field winding 62 and the variable resistor 63 across the power-supply conductors 27 and 28.

To vary the pressure between the discs 66, the terminal 68 may be secured to one end of a lever 69 that is pivotally mounted at 70. The other end of the lever 69 may be attached to the armature of the solenoid 65. The solenoid is disposed to actuate the lever in such direction that the pressure between the discs 66 is reduced. A spring 71 is provided for so biasing the lever 69 that the discs are pressed tightly together when the solenoid 65 is deenergized.

The solenoid 65 comprises two windings 72 and 73. The winding 72 is disposed in series-circuit relation to the armature 60 of the generator 56 and the series motor 57; therefore, the lever 69 will be actuated in accordance with the armature current of the generator in order that the current in the field winding 62 of the generator may be varied in inverse proportion. The winding 73 may be energized by current from a suitable source of direct current whereby the sensitivity of the solenoid to variations of current in the generator 56 may be modified. The current in the winding 73 may be varied by means of a variable resistor 74 disposed in series-circuit relation to the winding.

When the supply roll disposed on the reel 1 is of a maximum diameter, the current in the field winding 62 may be adjusted to such value that the voltage developed by the generator 56 will be that required to give the proper tension desired in the material. As the diameter of the supply roll becomes smaller, the voltage developed will tend to increase, thereby causing the current in the winding 72 of the solenoid to increase. In response to the increase in current, the lever 69 will be actuated to effect a decrease in pressure between the discs 66; therefore, the current in the field winding 62 will be decreased to reduce the voltage of the generator to the adjusted or desired value. In order to prevent hunting, a dash pot 76 and a spring 77 are provided for damping sudden movements of the lever 69. As shown, the piston of the dash pot is connected to the core or armature of the solenoid 65 through a spring 77.

If it be assumed that material 2 is to be wound on the cylindrical core 14 of the winder drum 4, material is first unwound from the reel 1 and threaded between the respective rollers 5 to 12, inclusive, of the calender stack 3. In order to thread the paper between the respective rollers of the calender stack, the motor 16 may be energized intermittently until the material has been threaded between all of the rollers. After the material has been threaded through the rollers, additional material is unwound from the reel 1 until a few turns of material are wound upon the cylindrical core 14. While this is being done, a certain amount of slack will develop in the material extending between the winder 4 and the rolls 11 and 12 of the stack 3.

In order to take up the slack in the material 2, the motor 38 may be started to effect operation of the booster generator 37. The generator 37 will supply sufficient voltage to the motors 18 and 19 to cause them to rotate until the slack in the material 2 has been wound upon the cylindrical core 14 of the winder 4. The motors will continue to rotate until the tension in the material 2 is equal to the torque developed by them.

Assuming that conditions are such that the material may be unwound from the reel 1 and re-wound upon the cylindrical core 14 of the winder 4, then the motor 38 may be connected, for operation, to a three-phase source of alternating-current power 79. In order to connect the motor 38 to the source of power 79, a push-button switch 80 is provided. When the switch 80 is actuated to its circuit-closing position, an energizing circuit for the actuating coil of the switch 43 is established. This circuit extends from terminal of the supply conductor 27, through conductor 81, the actuating coil of the switch 43, conductor 82, the push-button switch 80, conductor 83, a stopping push-button switch 84 and conductors 85 and 86, to the supply conductor 28. The coil of the switch 43 being energized, the switch is closed, and a holding circuit for the actuating coil of the switch 43, an energizing circuit for an actuating coil of a line switch 87 and a motor circuit for the motors 18 and 19 are established.

The holding circuit for the coil of the switch 43 extends from conductor 85, which is energized, through the stopping push-button switch 84, conductor 83, conductor 88, contact fingers 89, bridged by a contact segment 90 and the coil of the switch 43, to the conductor 81 which is energized.

The energizing circuit for the actuating coil of the switch 87 may be traced from conductor 81, which is energized, through conductor 91, contact fingers 92—bridged by a contact segment 93—the actuating coil of the switch 87 and a conductor 94, to the conductor 85 which is energized.

The power circuit for the motors 18 and 19 has been traced previously herein and will not be repeated.

When the switch 87 is closed, the three-phase stator winding 96 of the motor 38 is connected across the three-phase power-supply conductors 79. The motor 38 will, therefore, operate to drive the torque generator 37.

If any slack exists in the material 2 extending between the calender-stack rollers 11 and 12 and the winder 4, the voltage developed by the generator 37 will be sufficient to cause the motors 18 and 19 to rotate until the slack has been taken up and the tension in the material is equal to the torque developed by the motors. When the slack has been taken up, the motor 16 may be connected for operation to the three-phase power-supply conductors 79 to drive the calender stack 3.

In order to connect the motor 16 to the power-supply conductors 79, a normally open starting push-button switch 98 is provided and disposed to establish, when actuated, an energizing circuit for the actuating coil of a line switch 99. The energizing circuit for the actuating coil of the line switch 99 extends from the energized conductor 86, through a stopping push-button switch 100, conductor 101, the contact members of the starting push-button switch 98, conductor 102, the actuating coil of the line switch 99 and conductors 103, 91 and 81, to supply conductor 27. Upon the closure of the switch 99, a holding circuit for the actuating coil of the switch and a motor circuit for the motor 16 are established.

The holding circuit for the actuating coil of the switch 99 extends from the conductor 101, which is energized, through a conductor 104, contact members 105, bridged by contact segment 106 of the switch 99, the actuating coil of the switch and conductors 103 and 91, to the conductor 81 which is energized.

The circuit for the motor 16 extends from the three-phase power-supply conductors 79 through the contact members of the switch 99 and the phase wound stator winding 107 of the motor 16.

When the motor 16 is connected to the three-phase power-supply conductors 79, the calender stack 3 and the generator 23 will be accelerated from a standstill condition to full running speed. As the calender stack and the generator 23 are accelerated, the voltage developed by the generator 23 will increase as the speed of the calender stack increases. The motors 18 and 19 will, therefore, accelerate at substantially the same rate.

It is to be noted that the voltage of the torque generator 37 adds to the voltage developed by the generator 38. But, as the voltage developed by the torque or booster generator 37 is just sufficient to maintain the proper tension in the material extending between the calender-stack rollers and the winder 4, it follows that the base tension will be maintained in the material from the standstill conditions to the full running speed of the winder 4 and the calender-stack rollers.

When the calender-stack rollers are operating, the supply drum reel 1 and the generator 56 will be driven by the pull of the material 2. The voltage developed by the generator 56 will be impressed on the series motor 57 which motor will add to the motive power transmitted through the shaft 17 to the calender-stack rollers. It, therefore, follows that the generator 56 will act as a drag on the reel 1, thereby maintaining tension in the material extending between the supply reel 1 and the calender-stack rollers 5 and 6.

When the motors 18 and 19 are connected in parallel-circuit relation, as shown in Fig. 1, the current in the field winding 33 of the motor 19 is adjusted to a lower value than that in the winding 26 of the motor 18. Therefore, when full voltage is applied, motor 19 will tend to operate at a higher speed and will, accordingly, develop a greater torque than the motor 18. During the acceleration of the motors, however, the motor 19 may develop a lower torque because of the fact that the "field" flux is weaker than that of motor 18.

Where the requirements are such that the relative torques developed by the motors 18 and 19 shall be maintained at a fixed or approximately constant ratio, during the acceleration period, the armatures 24 and 31 of the motors may be connected in series-circuit relation, as shown in Fig. 3. In such arrangement, the current in the field windings 26 and 33 may be so adjusted that the motor 19 will develop a greater torque than motor 18. Since the armature windings of the motors are connected in series-circuit relation, the current in both windings will be equal; therefore, the motor 19 will develop a higher torque than the motor 18, because the current in the field winding 33 is greater than that in the winding 26.

By the invention herein disclosed, the winder 4 may be caused to operate in such manner that a constant base tension is always supplied to material to be wound on the winder drums extending between the reel and the calender stack 3. The base tension is derived from the booster generator 37 which impresses a voltage on the driving motors 18 and 19 of such value that the torque developed by the motors will be equal to the desired base tension to be applied to the material 2.

In order to maintain the base tension supplied by the booster generator 37 during the acceleration period of the calender stack 3 and the winder drum 4, the power generator 23 is provided. The generator operates to increase the voltage impressed on the motors 18 and 19, as the speed of the calender stack increases. Therefore, since the voltage developed by the generator 23 varies as the speed of the calender-stack rollers, the voltage impressed on the motors 18 and 19 will vary accordingly. Therefore, the counter-electromotive force developed by the motors 18 and 19 will vary as the voltage supplied thereto from the generator 23 varies. Because of this characteristic, the current in the motors 18 and 19 will be substantially constant and, accordingly, the torque developed by them will be substantially constant.

Various modifications may be made in the system herein disclosed without departing from the spirit and the scope of my invention. It is desired, therefore, that the specific embodiment of the invention shall be interpreted in an illustrative, but not in a limiting, sense.

I claim as my invention:

1. In a control system, in combination, a calendar stack, a plurality of winder rollers disposed to wind material from the calendar stack, a motor for each of said winder rollers, a source of power, means for connecting the motors to said source of power, and an auxiliary source of power connected to said motors for supplying current of a predetermined value to said motors, whereby a torque of a predetermined value is developed by said motors to thereby exert tension of a predetermined value on said material.

2. In combination, a calender stack, a plurality of winder rollers disposed to wind material from said calendar stack, a motor for driving each of said winder rollers, a main source of power for said motors, and an auxiliary source of power for the motors, said auxiliary source of power being disposed to add to the main source of power with respect to said motors, whereby a base tension of a predetermined value may be applied to said material independently of, and in addition to, the tension resulting from the main source of power.

3. In combination, a source of supply of material arranged to be wound upon winder rollers, a plurality of winder rollers, means for driving said rollers independently, whereby the material may be transferred from the source of supply and wound upon said winder rollers, and means for supplying accelerating energy to said rollers independently of said driving means.

4. In a control system for winder rollers, in combination, a calendar stack comprising a plurality of rollers through which material may pass from a source of supply of material, a plurality of winder rollers disposed to wind material from said calendar stack, motors for driving each of said winder rollers, two motor-generator sets disposed for independent operation, means for connecting the armature of the generator in one set in series-circuit relation to the armature of the generator in the other set, means for adjusting the generators to develop different predetermined voltages, and means for connecting the series-connected generator armatures to said motors.

5. In a control system, in combination, a roll having a supply of material wound thereon, a generator disposed for operation by said material-supplying roll, a calendar stack comprising a plurality of rollers, a power-generator, two motors disposed to drive said calender stack rollers and said power generator, one of said motors being a series motor, means for connecting said series motor to the material-supplying-roll generator, and means for winding material as it is drawn from the supply roll through the calender stack, said series motor being operable to stop the supplying-roll generator in response to a break in the material between the supply roll and the calender stack.

6. In a control system, in combination, a roll having a supply of material wound thereon, a generator disposed for operation by said material-supplying roll, a calender stack comprising a plurality of rollers, a power-generator, two motors disposed to drive said calender-stack rollers and said power generator, one of said motors being a series motor, means for connecting said series motor to the material-supplying-roll generator, a plurality of winder rolls disposed to wind material as it passes from the supply roll through the calender stack, a driving motor for each of the winder rolls, and means for connecting said motors in parallel-circuit relation across the power generator.

7. In a control system, in combination, a roll having a supply of material wound thereon, a generator disposed for operation by said material-supplying roll, a calender stack comprising a plurality of rollers, a power-generator, two motors disposed to drive said calender stack rollers and said power generator, one of said motors being a series motor, means for connecting said series motor to the material-supplying-roll generator, means for winding material as it is drawn from the supply roll through the calender stack comprising a plurality of winder rollers disposed to wind material as it passes from the supply roll through the calender stack, a driving motor for each of the winder rollers, means for connecting said motors in parallel-circuit relation across the power generator, and means for causing said motors to develop a torque of a predetermined value independently of the power supplied to said motors by the power generator.

8. In a control system, in combination, a roll having a supply of material wound thereon, a generator disposed for operation by said material-supplying roll, a calender stack comprising a plurality of rollers, a power-generator, two motors disposed to drive said calender-stack rollers and said power generator, one of said motors being a series motor, means connecting said series motor to the material-supplying-roll generator, a plurality of winder rollers disposed to wind material as it passes from the supply roll through the calender stack, a driving motor for each of the winder rollers, means for connecting said motors in parallel-circuit relation across the power generator, and means for causing said motors to develop a torque of a predetermined value independently of, but in addition to, that developed because of the power supplied to the motors from the power generator.

9. In a control system, in combination, a roll having a supply of material wound thereon, a generator disposed for operation by said material-supplying roll, a calender stack comprising a plurality of rollers, a power-generator, two motors disposed to drive said calender-stack rollers and said power generator, one of said motors being a series motor, means for connecting said series motor to the generator driven by said material-supply roll, a plurality of winder rollers disposed to wind material as it passes from the supply roll through the calender stack, a driving motor for each of the winder rollers, means for connecting said motors in parallel-circuit relation across the power generator, and means for adjusting said winder-roller motors to develop different relative torques.

10. In a control system, in combination, a roll having a supply of material wound thereon, a generator disposed for operation by said material-supplying roll, a calender stack comprising a plurality of rollers, a power generator, two motors disposed to drive said calender-stack rollers and said power generator, one of said motors being a series motor, means for connecting said series motor to the material-supplying-roll generator, a plurality of winder rollers disposed to wind material as it is drawn from the supply roll through said calender stack, a motor for driving each winder roller, a booster generator, means for driving said booster generator, and means for connecting said booster generator in series-circuit relation to the power generator across the winder-roller motors.

11. In a control system, in combination, a roll having a supply of material wound thereon, a generator disposed for operation by said material-supplying roll, a calender stack comprising a purality of rollers, a power generator, two motors disposed to drive said calender-stack rollers and said power generator, one of said motors being a series motor, means for connecting said series motor to the material-supplying-roll generator, a plurality of winder rollers disposed to wind material as it is drawn from the supply roll through said calender stack, a motor for driving each winder roller, a booster generator, means for driving said booster generator, means for connecting said booster generator in series-circuit relation to the power generator and across the winder-roller motors, and means for supplying power from the booster generator to said winder-roller motors either independently of, or in addition to, the power supplied from the power generator.

In testimony whereof, I have hereunto subscribed my name this 10th day of July, 1929.

STEPHEN A. STAEGE.